United States Patent [19]
Sasaki et al.

[11] Patent Number: 5,623,465
[45] Date of Patent: Apr. 22, 1997

[54] OPTICAL DISK PLAYER WITH A DIGITAL SERVO-CONTROL CIRCUIT INCORPORATING A TIME SHARING MULTIFUNCTIONAL DIGITAL FILTER

[75] Inventors: Takeshi Sasaki; Hidenobu Noda, both of Kanagawa, Japan

[73] Assignee: Sony Corporation, Tokyo, Japan

[21] Appl. No.: 257,473

[22] Filed: Jun. 9, 1994

Related U.S. Application Data

[63] Continuation of Ser. No. 971,897, Nov. 4, 1992, abandoned.

[30]   Foreign Application Priority Data

| Nov. 6, 1991 | [JP] | Japan | 3-319960 |
| Nov. 8, 1991 | [JP] | Japan | 3-321393 |

[51] Int. Cl.⁶ .................................................. G11B 7/095
[52] U.S. Cl. ................................... 369/44.32; 369/44.34; 369/44.35
[58] Field of Search .......................... 369/44.32, 44.36, 369/54, 58, 44.29, 44.34, 44.35

[56]   References Cited

U.S. PATENT DOCUMENTS

| 4,203,008 | 5/1980 | Cohn-Sfetcu et al. | 370/50 |
| 4,817,073 | 3/1989 | Suzuki . | |
| 4,942,567 | 7/1990 | Shiba | 369/124 |
| 5,056,074 | 10/1991 | Tateishi et al. | 369/44.28 |
| 5,065,386 | 11/1991 | Takeya et al. | 369/44.32 |
| 5,265,081 | 11/1993 | Shimizume et al. | 369/48 |

FOREIGN PATENT DOCUMENTS

| 0207374A3 | 1/1987 | European Pat. Off. . |
| 0249462A1 | 12/1987 | European Pat. Off. . |
| 0324859A1 | 6/1988 | European Pat. Off. . |
| 0362987A2 | 4/1990 | European Pat. Off. . |
| 0363195A2 | 4/1990 | European Pat. Off. . |
| 0388519A3 | 9/1990 | European Pat. Off. . |
| 0388958A2 | 9/1990 | European Pat. Off. . |
| 0395403A2 | 10/1990 | European Pat. Off. . |
| 0390467A2 | 10/1990 | European Pat. Off. . |
| 0409574A2 | 1/1991 | European Pat. Off. . |
| 01143025 | 6/1989 | Japan . |
| 1433576 | 4/1976 | United Kingdom . |
| WO89/06423 | 7/1989 | WIPO . |

OTHER PUBLICATIONS

Harman, Thomas L., *The Motorola MC 68000 Microprocessor Family*, 1985, pp. 22–28.

B. P. Lathi, "Modern Digital and Analog Communication Systems", 1983, pp. 81 and 52.

*Primary Examiner*—W. R. Young
*Attorney, Agent, or Firm*—Limbach & Limbach L.L.P.

[57]  ABSTRACT

An optical disk player provided with a digital servo circuit uses a time-sharing multifunctional digital filter, in which a plurality of filter functions are realized with a single filter. By lowering the sampling frequency of the plurality of digital filter functions than the master clock of the signal processing circuit and operating the plurality of digital filters on a time-sharing basis, the number of steps of the signal processing command can be decreased and the circuit scale can be reduced. By constructing a High Pass Tracking Zero Cross HPF and an anti-shock BPF of a digital filter using the same step, reduction in the circuit scale and increase in the sampling rate can be attained.

2 Claims, 6 Drawing Sheets

OPTICAL DISK PLAYER WITH A DIGITAL SERVO-CONTROL CIRCUIT INCORPORATING A TIME SHARING MULTIFUNCTIONAL DIGITAL FILTER

This is a continuation of application Ser. No. 07/971,897 filed on Nov. 4, 1992, now abandoned.

FIELD OF THE INVENTION

The present invention relates to an optical disk player using a digital servo-control circuit and, more particularly, to a digital servo circuit having servo control functions for tracking servo, focus servo, and thread servo. It further relates, with respect to a tracking servo circuit, to an optical disk player using a digital servo circuit having an anti-shock function.

DESCRIPTION OF TEE RELATED ART

When a defect is present in the signal surface of a disk in a tracking or focus servo circuit of an optical disk player such as a CD player, there is a possibility that a normal error signal becomes unobtainable and an out-of-servo state is brought about. Therefore, when a defect is detected, it is practiced to use a pseudo error signal instead of each error signal to stabilize the servo. As the pseudo error signal, a low frequency component of each error signal obtained immediately before the detection of the defect is used. Therefore, each servo circuit is provided with an LPF (low-pass filter) for extracting the low-frequency component from each error signal.

The optical pickup for reading information from the signal surface of a disk is controlled for its position in the radial direction of the disk by a thread servo circuit. In the thread servo circuit, a low-frequency component of the tracking error signal is used for the driving signal of a thread motor as the driving unit of the optical pickup. Accordingly, an LPF is required also in the thread servo circuit for extracting a low-frequency component from the tracking error signal.

When it is considered to construct a digital arrangement of the servo circuits having such various filters, there arises a problem, if the filters should be provided independently of one another, that the steps of DSPs (digital signal processors) increase and the scale of the circuit expands.

Figure 1:
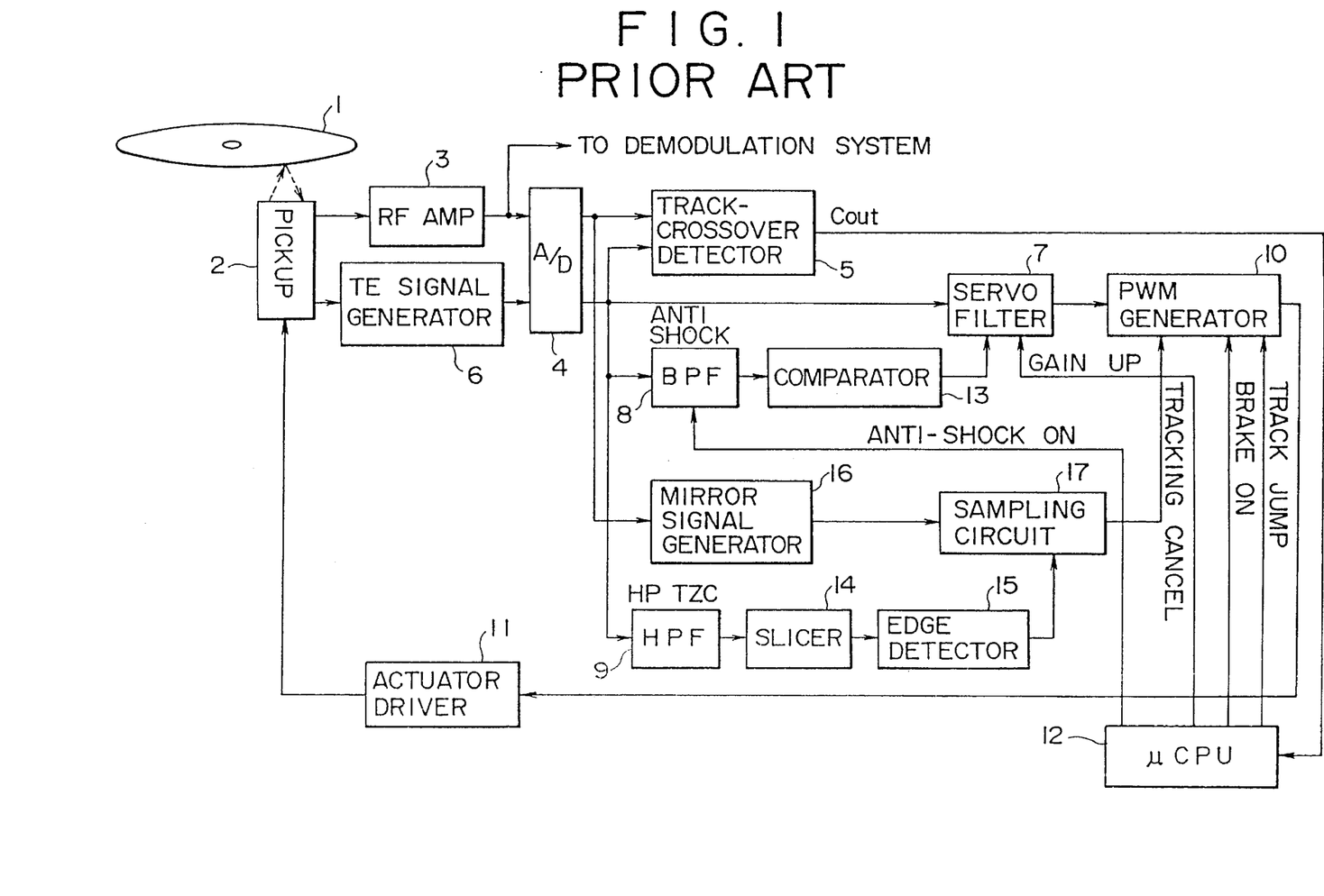
FIG. 1 is a block diagram showing a structure of a conventional example of a tracking servo circuit.

As a tracking servo circuit, that arranged as shown in FIG. 1 is hitherto known. Referring to FIG. 1, recorded information on a disk 1 is read by an optical pickup 2 and the read RF signal is supplied to the demodulation system through an RF amplifier 3 and supplied also to a track-crossover detector 5 after being digitized in an A/D converter 4. A tracking error (TE) signal generator 6 generates a tracking error signal having the so-called S-curve characteristic through such a generation method as the well-known three-beam method according to the output of the optical pickup 2. The tracking error signal is passed through the A/D converter 4 and supplied to a servo filter 7, an anti-shock BPF (bandpass filter) 8, and an HPTZC (High Pass Tracking Zero Cross) HPF (high-pass filter) 9. The tracking error signal passed through the servo filter 7 is supplied to a PWM generator 10.

Figure 2:
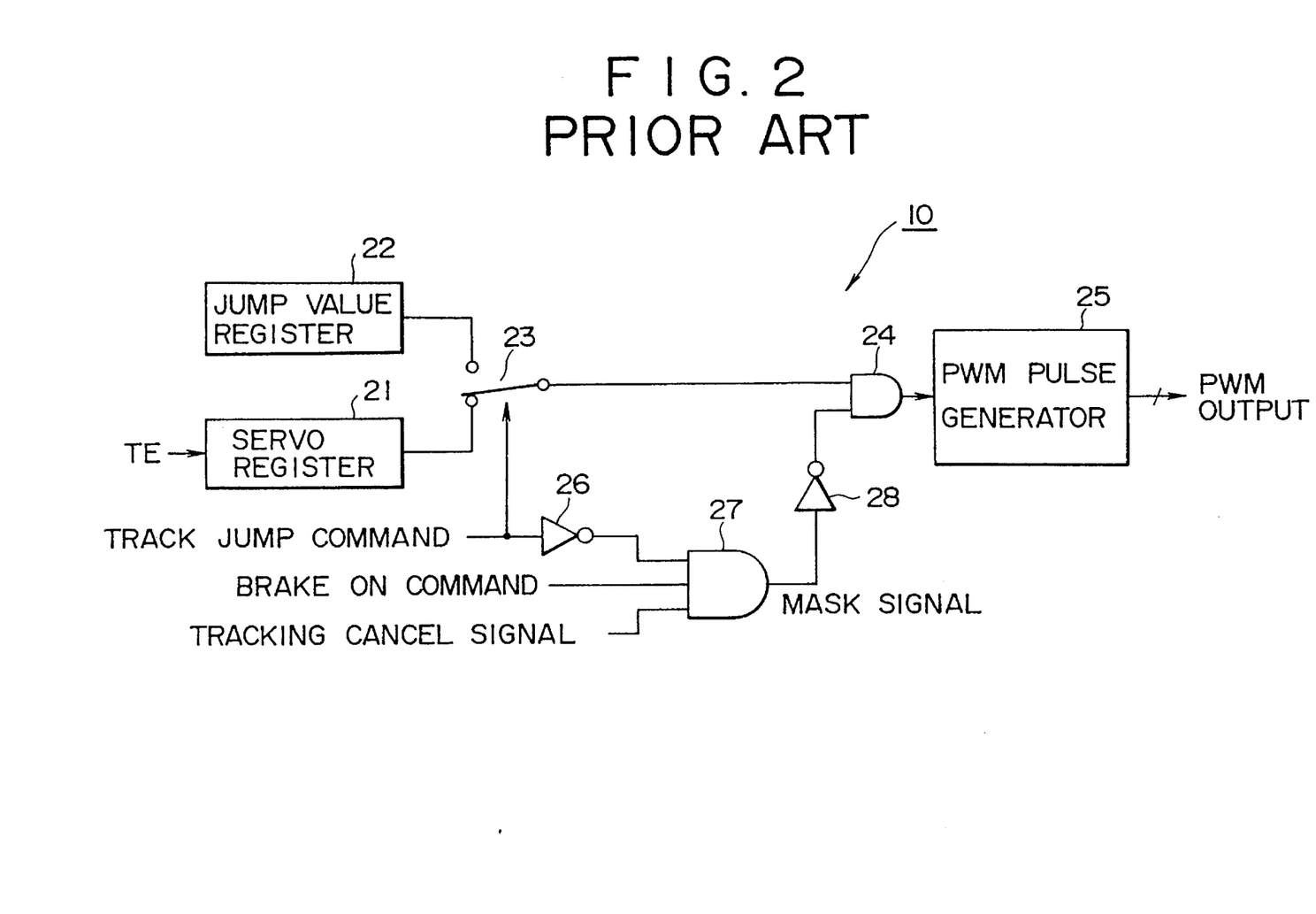
FIG. 2 is a block diagram showing a structure of a conventional PWM generator.

The PWM generator 10, as shown in FIG. 2, is adapted to select either the tracking error value passed through a servo register 21 in a servo ON state or a jump value from a jump value register 22 by means of a selector switch 23 in response to a track-jump command issued at the time when a track-jump operation is to be made and supply the selected value to a PWM pulse generator 25 through an AND gate 24. In the servo ON state, the tracking error signal is turned into a pulse corresponding to its signal level, and the pulse is supplied, through an actuator driver 11, to a tracking actuator in the optical pickup 2 as a driving signal. Thereby, the position of the information reading optical spot in the radial direction of the disk with respect to the track (pit string), from which information is being read, of the disk 1 is controlled.

When a track-jump command is issued from a μCPU (microcomputer) 12, the PWM generator 10 generates a jump pulse with a pulse width corresponding to the number of tracks which the information reading light spot has to cross over according to a jump value output from the jump value register 22 and supplies the pulse to the tracking actuator through the actuator driver 11. During the jump operation, the servo is in an OFF state.

In the anti-shock BPF 8, only a frequency component of a specified frequency band is extracted from the tracking error signal. The extracted frequency component of the specified frequency band is supplied to a comparator 13 to be compared with a predetermined reference level. The comparison output is supplied to the servo filter 7 as a gain changeover signal. Then, if there is present an amplitude at a higher level than the reference level in the specified frequency band of the tracking error signal, it is determined that a vibration has occurred and control is exercised so that the gain of the servo filter 7 is raised. More specifically, when a vibration occurred in a CD player, especially in a portable type CD player, the vibration is detected and the gain of the servo filter 7 is raised, whereby it is made so that an out-of-servo state is hardly brought about. This is the so-called anti-shock function. Whether or not execution of the anti-shock function is selected is determined depending on whether or not an anti-shock ON signal for activating the anti-shock BPF 8 is output from the μCPU 12.

The phase of the tracking error signal is advanced by being passed through the HPTZC HPF 9 and turned into an HP (High-pass) TZC (Tracking Zero Cross) signal by being sliced in a slicer 14 taking the zero level as the slice level. The HPTZC signal is supplied to an edge detector 15 and its edge is detected therein. The HPTZC edge signal is supplied to a sampling circuit 17 for sampling a mirror signal at a high level originated from the mirror surface between tracks on the disk 1 and generated by a mirror signal generator 16. The sampling signal is supplied to the PWM generator 10 as a tracking cancel signal.

Referring to FIG. 2 again, the inverted signal of the track jump signal inverted by an inverter 26, a brake ON signal issued from the μCPU 12, and the tracking cancel signal output from the sampling circuit 17 constitute three inputs of an AND gate 27. The output of the AND gate 27 is supplied to the AND gate 24 as a mask signal and serves as a gate control signal of the AND gate 24. More specifically, the tracking cancel signal is rendered effective and serves as the mask signal when the brake ON command is issued while there is no issuance of the track-jump signal.

Figure 3:
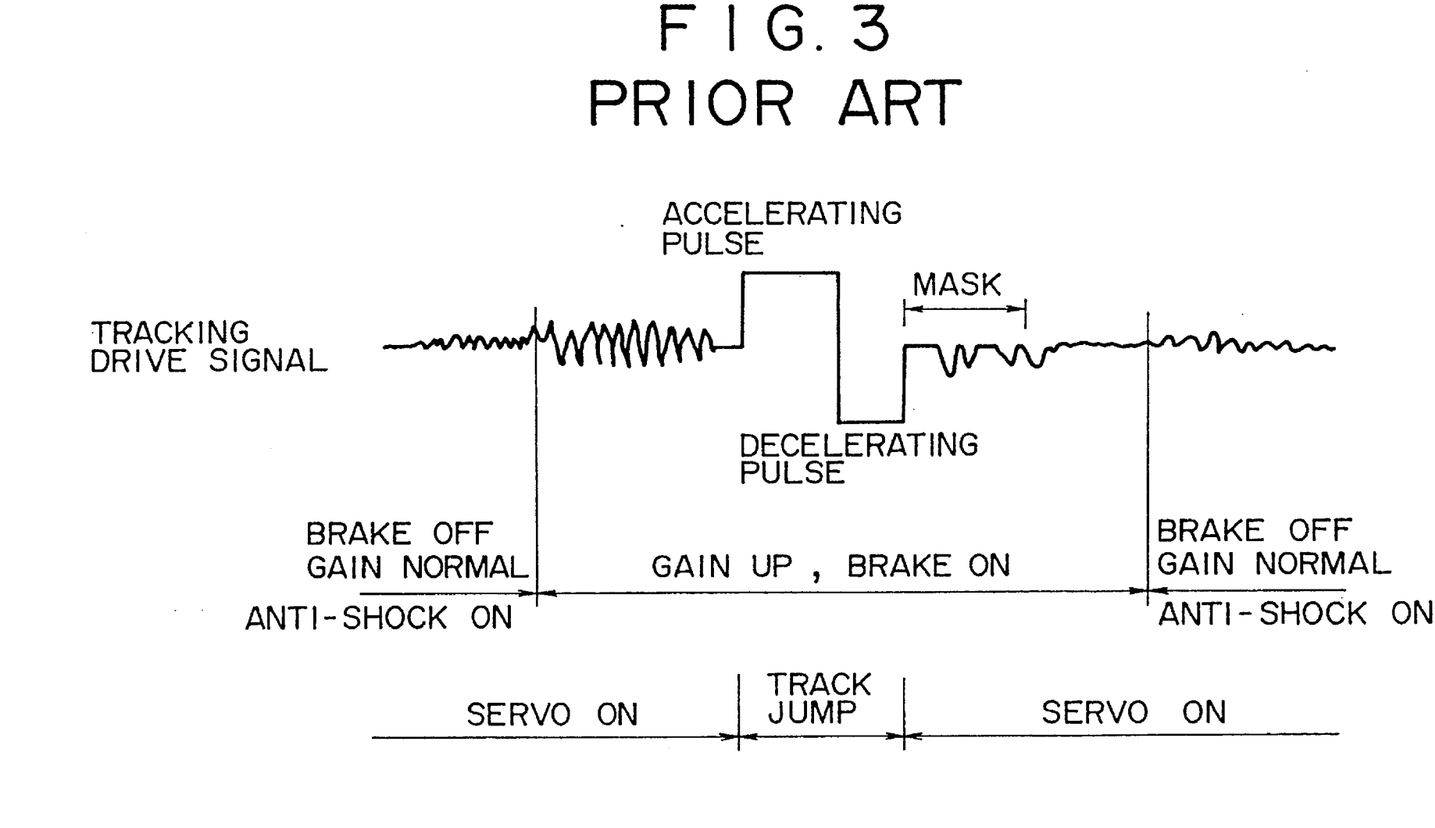
FIG. 3 is a waveform chart showing relationships between a tracking drive waveform and various commands in a conventional example.

Thus, as shown in FIG. 3, the tracking cancel signal is rendered effective immediately after a track jump has been performed, and the mask signal following it masks only the tracking drive signal waveform of the polarity corresponding to the track jump. As a result, a force in the opposite direction to that of the track jump, i.e., a braking force, is applied to the tracking actuator immediately after the jump has been performed.

During the truck jump operation, it is detected by the track-crossover detector 5 that the information reading light spot has crossed over a track according to the RF signal and the tracking error signal and, upon detection of it, a count out signal Gout is issued. Then, the μCPU 12 detects the track at the destination of the jumping by counting the count out signal Gout.

In the digital tracking servo circuit as described above, when the anti-shock BPF 8 is independently constructed using its own individual DSP (Digital Signal Processor) step, the DSP step becomes insufficient if the existing sampling rate (for example 88.2 KHz) is used. Hence, the sampling rate is decreased to save the DSP steps. However, decrease in the sampling rate invites complexity of the circuit configuration and, further tends, when the circuit is arranged in an IC, to deteriorate the performance of the IC as a whole.

SUMMARY OF THE INVENTION

A digital servo circuit according to the present invention comprises a defect detector for detecting a defect in the signal surface of an optical disk according to a read signal from the signal surface, a digital filter for sequentially extracting a first low-frequency component and a second low-frequency component from a tracking error signal and a low-frequency component from a focus error signal on a time-sharing basis according to coefficient-values set up therein, coefficient setting means for sequentially setting up predetermined coefficient values in the digital filter in synchronism with its time-sharing operation, a thread servo circuit for controlling an optical pickup for its position in the radial direction of the disk according to the first low-frequency component of the tracking error signal, a hold register for tracking for holding the second low-frequency component of the tracking error signal, a hold register for focusing for holding the low-frequency component of the focus error signal, a tracking servo circuit for controlling an information reading light spot for its position in the radial direction of the disk with respect to the track,of the optical disk, along which the information is being read, responding to the tracking error signal and, when a defect has been detected by the defect detector, responding to the output held in the hold register for tracking instead of responding to the tracking error signal, and a focus servo circuit for controlling an objective lens incorporated in the optical pickup responding to the focus error signal so that the distance of the objective lens from the signal surface of the optical disk remains constant and, when a defect has been detected by the defect detector, responding to the output held in the hold register for focusing instead of responding to the focus error signal.

In the digital servo circuit, which requires a filter for thread servo and filters for defect holding for tracking and for focusing, arranged as described above, since the frequency band of these filters is low and it is possible to decrease the sampling rate of them, it is realized to provide a single digital filter in terms of hardware with functions of a plurality of filters by allowing each of these filters to operate for example once for each 256 DSP periods and sequentially changing the coefficient values of multiplying coefficients of a digital filter and, thereby, utilizing the digital filter on a time-sharing basis.

The present invention, directed to the provision of a tracking servo circuit for an optical disk player capable of reducing the circuit scale by saving the DSP steps and achieving a high sampling rate, comprises a digital filter for leading out a frequency component front a specified band and a high-frequency component of the tracking error signal in an alternative way according to coefficient values set up therein, gain control means for executing control, when the signal level of the frequency component of the specified band is higher than a specified reference level, to raise the servo gain, actuator control means applying a braking force to the tracking actuator using the high-frequency component when a brake ON command is issued, and coefficient setting means for setting up predetermined coefficient values in the digital filter depending on whether or not the brake ON command is issued. Thus, by changing the setting of coefficient values in the digital filter depending on whether or not the brake ON command is issued, a single digital filter can be provided with both the functions of a high Pass Tracking Zero Cross HPF and an anti-shock BPF and both the filters can be formed on the same DSP step. As a result, it becomes possible to save the DSP steps and reduce the circuit scale and, further, to achieve a high sampling rate.

DESCRIPTION OF THE PREFERRED EMBODIMENTS

An embodiment of the present invention will be described below in detail with reference to the accompanying drawings.

Figure 4:
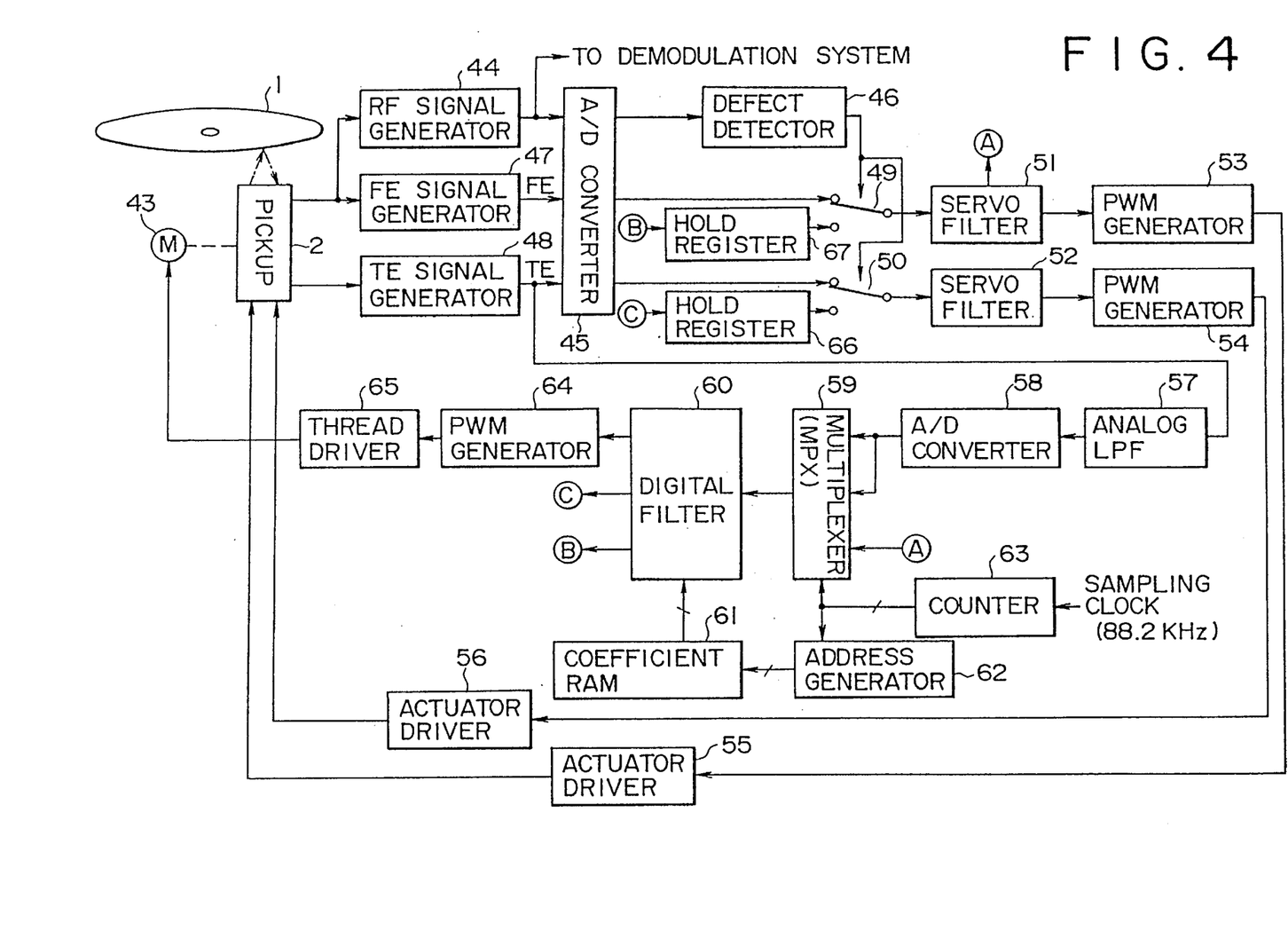
FIG. 4 is a block diagram showing an embodiment of a digital servo circuit according to the present invention.

FIG. 4 is a block diagram showing an embodiment of a digital servo circuit according to the present invention. Referring to FIG. 4, recorded information on a disk 1 is read by an optical pickup 2. The optical pickup 2 is operatively arranged for movement in the radial direction of the disk 1 with a thread motor 43 used as the driving unit. An RF signal read by the optical pickup 2 is passed through an RF signal generator 44 and supplied to the demodulation system and also digitized in an A/D converter 45 and becomes the detection input of a defect detector 46. The defect detector 46 is for detecting a defect such as a smear on or absence of pits in the signal surface of the disk 1.

A focus error (FE) signal generator 47 generates a focus error signal by such a generation method as the well-known astigmatic method, while a tracking error (TE) signal generator 48 generates a tracking error signal by such a generation method as the well-known three-beam method. The focus error signal and the tracking error signal are selectively supplied to a focus servo filter 51 and a tracking servo filter 52 through changeover switches 49 and 50, respectively.

The focus error signal and the tracking error signal passed through the servo filters 51 and 52 are supplied to PWM generators 53 and 54, respectively. The PWM generator 53 for focusing, in a servo ON state, turns the focus error signal into a pulse corresponding to the signal level of the focus error-signal and supplies the pulse to a focus actuator in the pickup 2 as the drive signal through an actuator driver 55. Thereby, the position of an objective lens incorporated in the optical pickup 2 in the direction perpendicular to the signal surface (in the direction of the optical axis) is controlled such that the information reading optical spot is brought into a just-focused state with respect to the signal surface of the disk 1.

The PWM generator 54 for tracking, in the servo ON state, turns the tracking error signal into a pulse corresponding to the signal level of the tracking error signal and supplies the pulse to a tracking actuator in the pickup 2 as the drive signal through an actuator driver 56. Thereby, the position of the information reading light spot in the radial direction of the disk with respect to the track (pit string) of the track 1, along which information is being read, is controlled.

The tracking error signal is further passed through an analog LPF 57 for eliminating the folding noise in A/D conversion and digitized in an A/D converter 58 and becomes two inputs of a multiplexer (MPX) 59 with three inputs and a single output. To the remaining input of the multiplexer 59 is supplied a low-frequency component of the focus error signal led out from the intermediate stage of the focus servo filter 51. The output of the MPX 59 is supplied to a digital filter 60.

Figure 5:
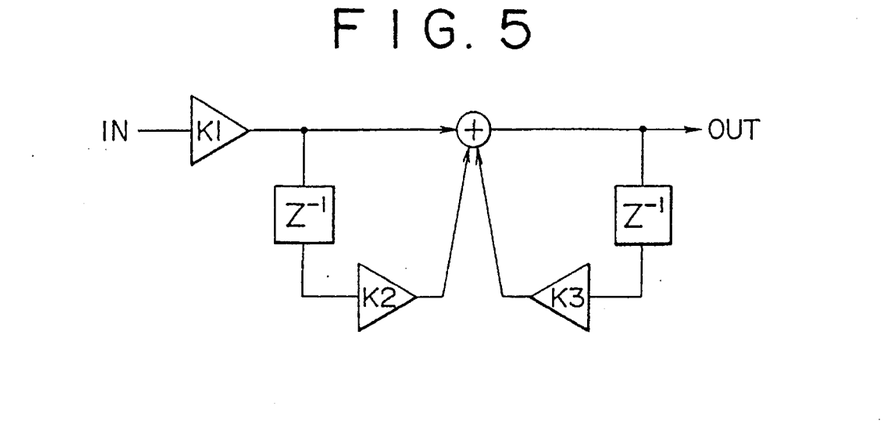
FIG. 5 is a structural diagram showing a digital filter according to the present invention.

The digital filter 60, as shown in FIG. 5, is arranged such that the coefficients K1 to K3 of its multiplying coefficients can be arbitrarily set up according to coefficient data output from a coefficient RAM 61. The coefficient RAM 61 reads the coefficient data stored at addresses specified by address signals output from an address generator 62 and outputs the coefficient data to the digital filter 60. The address generator 62 sequentially outputs predetermined address signals to the coefficient RAM 61 when count values for example of an 8-bit counter 63, which counts up by one for example each period of 88.2 KHz, are FF, 00, 01 (Hex), for example.

Thereby, three sequences of coefficient data are supplied from the coefficient RAM 61 to the digital filter 60 successively and cyclically at predetermined intervals. That is, the digital filter 60 functions as three systems of LPF on a time-sharing basis. The LPF of the first system is the filter for thread servo, which extracts a low-frequency component of the tracking error signal with the filter characteristic based upon the coefficient values set up therein and supplies the low-frequency component to a PWM generator 64 so as to be turned therein into a pulse corresponding to its signal level and, then, passed through a thread driver 65 to become the drive signal for a thread motor 43.

The LPFs of the second and third systems are the filters for defect holding which extract low-frequency components of the tracking error signal and the focus error signal and store the low-frequency components of the error signals into hold registers 66 and 67, respectively. When a defect of the disk 1 is detected by the defect detector 46, the changeover switch 49 is switched by the detection output and the held output by the hold register 67 is supplied as a pseudo error signal to the servo filter 51 instead of the focus error signal and, thereby, the player is prevented from going into an out-of-servo state due to a defect in the signal surface of the disk 1. The same is true with the tracking servo.

When the three systems of filters, i.e., the filter for thread servo, and the defect holding filters for focusing and tracking, are supposed to be independent units of one another when, for example, DSPs are arranged in 64 steps with respect to the master clock at 5.6448 MHz, each filter operates having 88.2 KHz taken as one cycle. However, the frequency band required of each filter is quite lower than 88.2 KHz. If sampling is performed at 88.2 KHz, the bits of coefficients and multipliers greatly increase in number.

Hence, in the present invention, the operations of the thread servo filter and the focus and tracking defect holding filters are decimated, i.e., they are arranged to operate once every 256 periods. Thereby, these filters are arranged to perform their sampling at 345 Hz in substance and the bits of the coefficients and multipliers can be prevented from increasing in number. Conversely, each filter operates only once for 256 periods. Hence, by utilizing the digital filter 60 on a time-sharing basis, it becomes possible to incorporate a plurality of filters into the filter, which is a single filter in terms of hardware. Thus, the number of steps of the DSP can be saved and accordingly the circuit scale can be reduced.

A second embodiment of the present invention will be described in detail with reference to the drawings.

Figure 6:
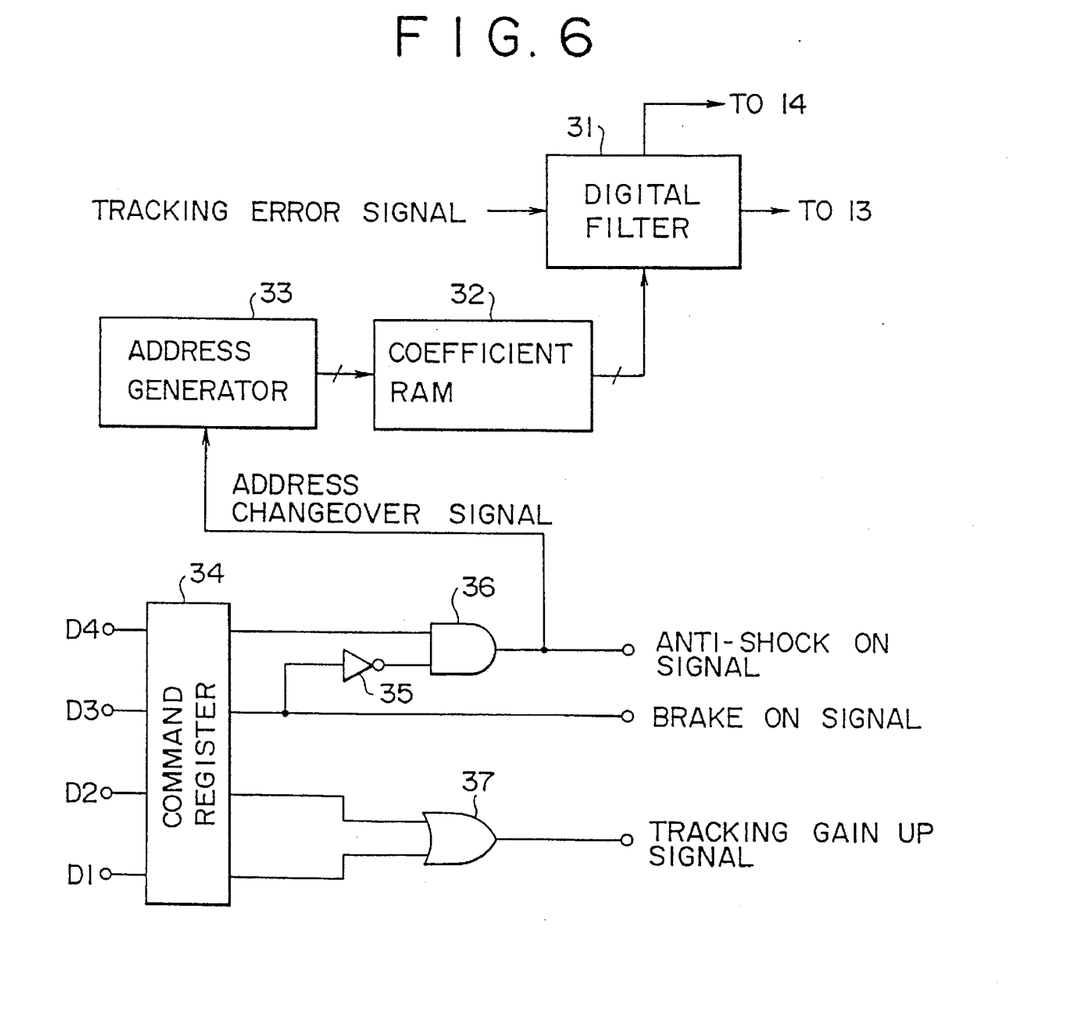
FIG. 6 is a block diagram showing a structure of the main part of a tracking servo circuit as a second embodiment of the present invention.

FIG. 6 is a block diagram showing the second embodiment of the present invention, in which the structure of only the main portion of a tracking servo circuit according to the present invention is shown. In FIG. 6, there is provided a single digital filter 31, which accepts the tracking error signal, corresponding to the anti-shock BPF 8 and the High Pass Tracking Zero Cross HPF 9 shown in FIG. 1. The digital filter 31 is arranged such that the coefficient value of each multiplying coefficient can be arbitrarily set up therein according to coefficient data output from a coefficient RAM 32.

The coefficient RAM 32 reads coefficient data stored at addresses specified by address signals generated by an address generator 33 and supplies them to the digital filter 31. The address generator 33 supplies the coefficient RAM 32 with two sequences of address signals corresponding to the anti-shock BPF and the High Pass Tracking Zero Cross HPF in response to an address changeover signal.

Meanwhile, 4-bit (D1 to D4) commands for controlling the tracking servo are issued from the μCPU 12 and the commands are stored into a command register 34. Of the commands D1 to D4, D4 is a control command for the anti-shock function, D3 is that for providing brake, and D2 and D1 are those for tracking gain UP. More specifically, anti-shock ON control is effected when the commands (D4 to D1) are (10), anti-shock OFF control is effected when they are (0*), brake ON control is effected when they are (*1), brake OFF control is effected when they are (0), tracking gain Normal control is effected when they are (00), and tracking gain UP control is effected when they are (01), (10), and (11).

Hence, the output of an AND gate 36 having the command signal D4 and the command signal D3 inverted by an inverter 35 as its two inputs becomes an anti-shock ON signal to be supplied to the address generator 33 as the address switchover signal, the command signal D3 as it is becomes the brake ON signal, and the command signals D2 and D1 are passed through an OR gate 37 and the output becomes the tracking gain UP signal.

Figure 7:
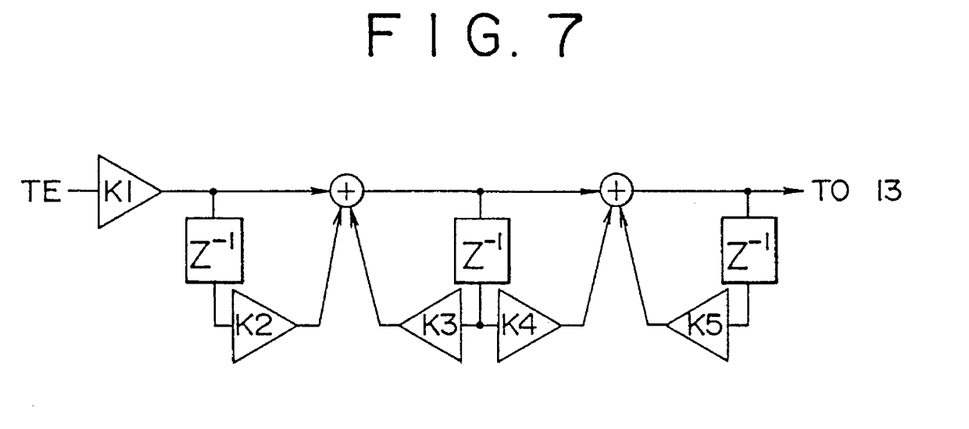
FIG. 7 is a structural diagram of a digital filter as an anti-shock BPF.

When the anti-shock ON command (10) is issued, the anti-shock ON signal is output and, at the same time, the address signal corresponding to the anti-shock BPF is output from the address generator 33. Thereupon, the coefficient data corresponding to the address signal is output from the coefficient RAM 32 to the digital filter 31. As a result, the digital filter 31 comes to constitute an anti-shock BPF by a combination of an HPF in the front stage and an LPF in the rear stage as shown in FIG. 7** and extracts a frequency component of a specified band from the tracking error signal.

Figure 8:
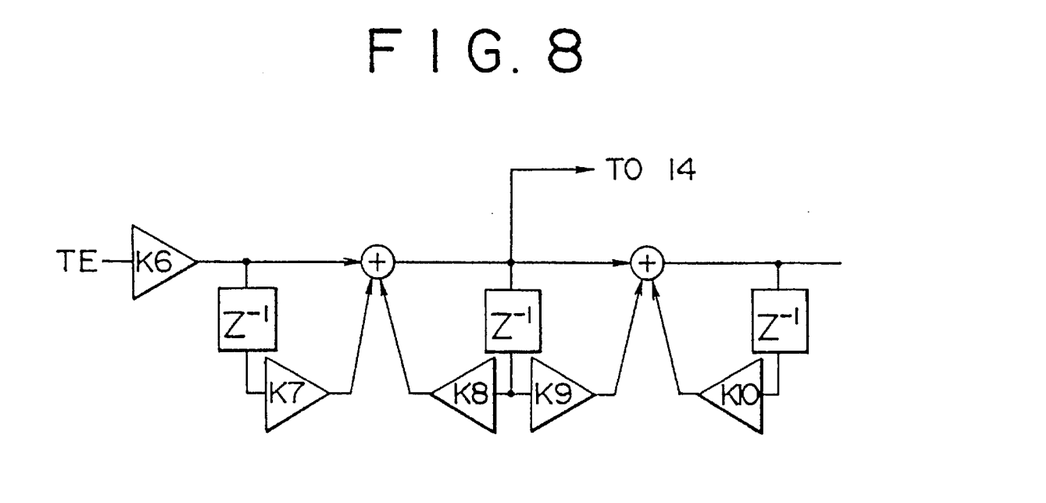
FIG. 8 is a structural diagram showing a digital filter as a High Pass Tracking Zero Cross HPF.

When, on the hand, the brake ON command (*1) is issued, the brake ON signal is output and, at the same time, the anti-shock ON signal disappears. Hence, an address signal corresponding to the High Pass Tracking Zero Cross HPF is generated by the address generator 33 and the coefficient RAM 32 outputs the coefficient data specified by the address signal to the digital filter 31. As a result, the digital filter 31 comes to constitute a High Pass Tracking Zero Cross HPF, of which only the HPF in the front stage is rendered effective as shown in FIG. 8**, and extract a high-frequency component from the tracking error signal.

As described above, the digital filter 31 has both functions of the anti-shock BPF and the High Pass Tracking Zero Cross HPF and is arranged such that both the filters are provided on the same DSP step. It functions as the anti-shock BPF in the anti-shock ON state and as the High Pass Tracking Zero Cross HPF in the brake ON state. Referring to FIG. 7 and FIG. 8, the multiplying coefficients K1 to K10 of the multipliers are predetermined coefficient values to be set up according to coefficient data output from the coefficient RAM 32.

Now, the anti-shock function is for bringing the servo filter 7 to a gain UP state, which means that the anti-shock function is not necessary when the servo filter 7 is already in the gain UP state. Further, since the servo filter 7 must be in the gain UP state when brake ON is effected immediately after a track jump, it is a general practice that the command for tracking gain UP is issued simultaneously with the brake ON command from the μCPU 12.

More specifically, since the servo filter 7 has already been in the gain UP state when the brake ON command is issued, the anti-shock BPF is not necessary during this time. In other words, the function of the High Pass Tracking Zero Cross HPF needed in the brake ON state and the function of the anti-shock BPF needed in the tracking gain Normal state are not performed simultaneously.

The above fact was taken into consideration in making this invention and it is adapted therein such that, while the digital filter 31 is allowed to function as an anti-shock BPF in the state of anti-shock ON, the digital filter 31 is not allowed to function as the anti-shock BPF when the brake ON command (*1) is rendered active even if the anti-shock ON command (10) is active, but allowed to function as a High Pass Tracking Zero Cross HPF.

By arranging such that the digital filter 31 is used either as the High Pass Tracking Zero Cross HPF or as the anti-shock BPF depending on presence or absence of the brake ON command, in spite of the anti-shock command being active, as described above, it has been made possible to provide both the filters in the same DSP step. Thereby, the DSP steps can be greatly saved, namely, by using only 64 steps of the DSP steps, 64 steps of servo functions for each of focusing, threading, and others can be realized and, hence, the circuit scale can be reduced. Besides, the sampling rate can be kept high (for example, at 88.2 KHz).

What is claimed is:

1. An optical disk player controlled by a digital servo circuit, comprising:

a defect detector for detecting a defect in a signal surface of an optical disk according to a signal read from the signal surface;

a multiplexer for generating a multiplexed output signal from a tracking error signal and a focus error signal generated from the signal read from the signal surface;

a single digital filter operative during a plurality of periods, the single digital filter for sequentially extracting from the multiplexed output signal a low-frequency component of the tracking error signal, a plurality of low-frequency components from the tracking error signal and a plurality of low-frequency components from the focus error signal on a time-sharing basis according to coefficient values set up therein, each sequential extraction occurring during only one of the plurality of periods;

coefficient setting means for sequentially setting up predetermined coefficient values in said digital filter in synchronism with its time-sharing operation, the coefficient setting means including an address generator and a coefficient memory;

a thread driver coupled to a first output of the single digital filter for controlling the position of an optical pickup in the radial direction of the disk according to the low-frequency component of said tracking error signal;

a hold register for tracking coupled to a second output of the single digital filter, for storing the plurality of low-frequency components of said tracking error signal;

a hold register for focusing coupled to a third output of the single digital filter for storing the plurality of low-frequency components of said focus error signal;

a tracking servo filter for controlling the position of an information reading light spot in the radial direction of the disk with respect to the track of the optical disk, along which the information is being read, in response to said tracking error signal and, when a defect has been detected by said defect detector, responding to the plurality of low-frequency components of said tracking error signal stored in said hold register for tracking instead of responding to the tracking error signal; and a focus servo filter for controlling an objective lens incorporated in said optical pickup responding to said focus error signal so that the distance of the objective lens from the signal surface of the optical disk remains constant and, when a defect has been detected by said defect detector, responding to the plurality of low-frequency components of said focus error signal stored in said hold register for focusing instead of responding to the focus error signal.

2. An optical disk player digital servo circuit, comprising:

an optical pickup for reading a signal from a signal surface of an optical disk;

a radio frequency signal generator for generating a radio frequency signal from the signal read from the signal surface;

a focus error signal generator for generating a focus error signal from the signal read from the signal surface;

a tracking error signal generator for generating a tracking error signal from the signal read from the signal surface;

a first analog-to-digital converter for digitizing the radio frequency signal, focus error signal and tracking error signal;

a defect detector coupled to a first output of the first analog-to-digital converter, the defect detector for detecting from the digitized radio frequency signal a defect in the signal surface of the optical disk;

a first servo filter coupled to a second output of the first analog-to-digital converter for filtering the digitized focus error signal in the absence of a defect in the signal surface of the optical disk and for filtering the contents of a hold register for focusing when a defect has been detected by the defect detector;

a second servo filter coupled to a third output of the first analog-to-digital converter for filtering the digitized tracking error signal in the absence of a defect in the signal surface of the optical disk and for filtering the contents of a hold register for tracking when a defect has been detected by the defect detector;

a first pulse width modulator for modulating a first actuator driver in response to an output of the first servo filter;

a second pulse width modulator for modulating a second actuator driver in response to an output of the second servo filter;

an analog low pass filter coupled to the tracking error signal generator for filtering the tracking error signal;

a second analog-to-digital converter for digitizing a filtered tracking error signal from the analog low pass filter;

a multiplexer for time division multiplexing the digitized filtered tracking error signal and a digitized filtered focus error signal from an output of the first servo filter;

a single digital filter operative during a plurality of periods, the single digital filter for sequentially extracting from an output of the multiplexer a low-frequency component of the digitized filtered tracking error signal, a plurality of low-frequency components from the digitized filtered tracking error signal and a plurality of low-frequency components from the digitized filtered focus error signal on a time-sharing basis according to coefficient values set up therein, each sequential extraction occurring during only one of the plurality of periods, the low-frequency component from the digitized filtered tracking error signal provided to a third pulse width modulator, the plurality of low-frequency components from the digitized filtered tracking error signal provided to the hold register for tracking, and the plurality of low-frequency components from the digitized filtered focus error signal provided to the hold register for focusing;

a sampling clock;

a counter operative to provide count values in response to an output of the sampling clock;

coefficient setting means for sequentially setting up predetermined coefficient values in said digital filter in synchronism with its time-sharing operation, the coefficient setting means including an address generator and a coefficient memory, the address generator operative to sequentially output predetermined address signals to the coefficient memory in response to the count values; and a thread driver coupled to an output of the third pulse width modulator for controlling the position of the optical pickup in the radial direction of the disk according to the low-frequency component from the digitized filtered tracking error signal.

\* \* \* \* \*